UNITED STATES PATENT OFFICE.

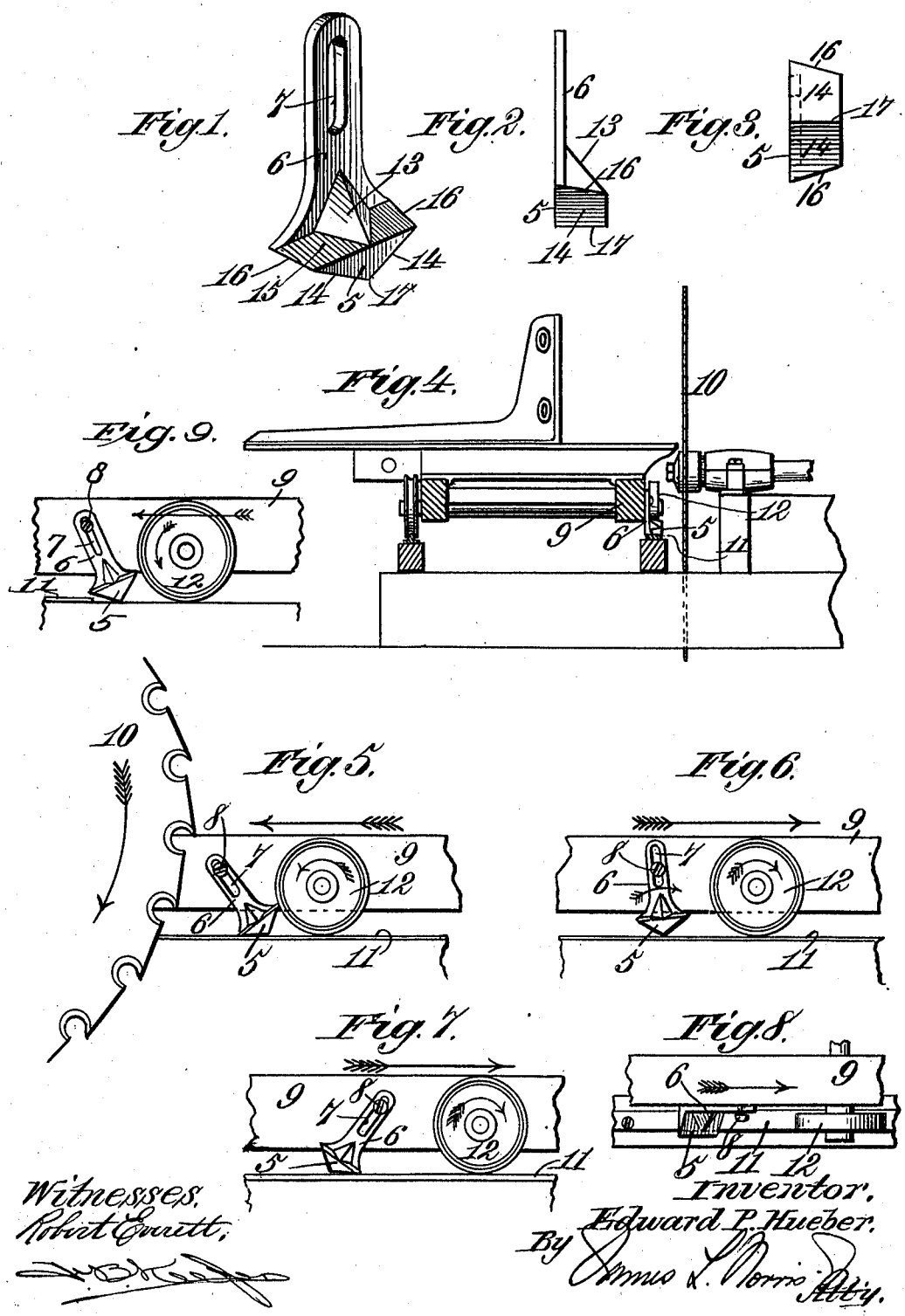

EDWARD P. HUEBER, OF HACKETTSTOWN, NEW JERSEY, ASSIGNOR TO AMERICAN SAW-MILL MACHINERY COMPANY, OF HACKETTSTOWN, NEW JERSEY, A CORPORATION OF NEW JERSEY.

TRACK-SCRAPER FOR SAWMILL-CARRIAGES.

982,679.  Specification of Letters Patent.  Patented Jan. 24, 1911.

Application filed September 1, 1910. Serial No. 579,969.

*To all whom it may concern:*

Be it known that I, EDWARD P. HUEBER, a citizen of the United States, residing at Hackettstown, in the county of Warren and State of New Jersey, have invented new and useful Improvements in Track-Scrapers for Sawmill-Carriages, of which the following is a specification.

This invention relates to track scrapers for saw mill carriage tracks, and the primary object of the invention is to provide simple and effective means for removing sawdust and other refuse from saw mill carriage tracks and to have said means operate automatically without the use of springs or other analogous controlling devices of manually operated mechanisms. The improved track scraper is loosely held on the carriage frame in operative relation to the track which it is intended to clean and accommodates itself or has a self-reversing movement to properly engage the track in accordance with the movement of the carriage in opposite directions over the track.

In the drawing: Figures 1, 2 and 3 respectively illustrate perspective, edge elevation and bottom plan views of a scraper embodying the features of the invention. Fig. 4 is a cross-sectional view of a saw mill carriage and track showing the improved scraper applied to the track adjacent to a saw also illustrated in edge elevation. Fig. 5 is a detail side elevation on an enlarged scale of a portion of a saw, saw mill carriage and track illustrating the position of the scraper when the carriage has a feeding movement toward the saw. Fig. 6 is a detail side elevation on an enlarged scale of a portion of a carriage and track indicating the carriage as starting to make a return movement and the position of the scraper under such conditions. Fig. 7 is a view similar to Fig. 6 illustrating the scraper fully reversed. Fig. 8 is a top plan view of a portion of a carriage and track showing the scraper engaging the track and particularly illustrating the inclined scraping edges thereof. Fig. 9 is a side elevation of a portion of a carriage and track showing the scraper in the position which it assumes in the event that the wheels of the carriage run off the track.

The scraper structurally includes a substantially triangular solid cleaning head 5 and a suspending shank 6 of any suitable length and formed with an elongated slot 7 to receive a fastening 8 which is inserted in the outer portion of the side rail 9 of the carriage adjacent to the saw 10. The scraper is loosely connected to the side rail 9 by the fastening 8 so that it will have a free gravitating movement or may readily rise and fall and also swing easily in opposite directions to accommodate the direction of movement of the carriage, but during all of its movements the cleaning head 5 of the scraper continually engages the track 11 as long as the wheels 12 of the carriage are in engagement with said track. As hereinbefore indicated, the cleaning head 5 is solid and of substantially triangular form, and to strengthen the same relatively to the shank or to set up a strong connection between the head and shank, an integral connecting rib 13 is provided. The head 5 is formed with two lower angular faces 14 which intersect and have such angle that when the scraper is swung over in either one of two positions one of the faces will rest fully on the track and the weight of the scraper as an entirety will insure a close contact of either one of said faces with the track rail. The upper side 15 of the head is flat and intersects the adjacent face of the shank 6 in planes at right angles and the opposite terminals of the same also intersect the angular faces 14 and form with the latter scraping edges 16 which are inclined, the two edges having an outer converging relation so that when either of the said edges is down on the track rail it will operate to throw the sawdust and other accumulations on the track rail outwardly from the latter or over the outer side of the carriage.

It is proposed to form the scraper of suitable metal in one piece and dress the same in such manner as to give the faces 14 smooth surfaces and also to produce the scraping edges 16. In its reversing movements the scraper swings on the apex 17 which serves as a fulcrum and facilitates the quick overturning or reversing of the scraper.

As many of the scrapers may be used on a saw mill carriage as desired and found necessary. It is preferred that one be applied adjacent to each wheel or roller 12, as shown by Figs. 5, 6 and 7, the said scrapers as shown applied being in advance of the wheels. It is also proposed to arrange the scrapers between the wheels so as to insure a thorough cleaning of the track rail with which the scrapers engage. Should the carriage be operated in either direction to a point where the one wheel runs off the track, as shown by Fig. 9, the scraper will be suspended with the one sharp edge a little above the top of the track, and when the carriage moves forward the scraper will not catch on the end of the track but will ride over the latter owing to the adjacent inclined face 14 and assume its proper position on the track.

The operation of the scraper will be readily understood from the foregoing description and the illustrations in the drawing, especially from Figs. 5, 6 and 7. When the carriage is moving toward or feeding relatively to the saw 10, the scraper in advance of each wheel or roller 12 is thrown over into the position illustrated by Fig. 5 so that one edge 16 and the adjacent face 14 lie in close relation to the track rail and the other edge 16 is at this time uppermost and adjacent to the periphery of the wheel 12, but does not in the least bind against the wheel or obstruct its free movement in view of the fact that the slot 7 in the shank 6 of the scraper allows the latter to have sufficient play or looseness both in relation to the track and the wheel to obviate any binding action of the scraper. When the carriage starts to return, the scraper automatically reverses and swings on the apex 17, as shown by Fig. 6, until fully overturned as illustrated by Fig. 7, when the reverse edge 16 and face 14 come into contact with the track rail. It will therefore be observed that the scraper cleans the track rail in both its forward and return movements, and owing to the adjacency of one edge 16 of the scraper to the wheel 12 during the forward or feeding movement of the carriage, any matter clinging to the wheel will be cleared from said wheel.

The improved scraper will be found exceptionally advantageous in its operation and owing to its simplicity may be manufactured and applied at a minimum cost.

What is claimed is:

1. The combination with a saw mill carriage, of a track scraper having a shank loosely secured to the carriage and also provided with a head of approximately triangular form, the head having rail engaging faces intersecting each other and also converging cleaning edges.

2. The combination with a saw mill carriage, of a track scraper having a slotted shank loosely connected to the carriage and having a free gravitating and reversing movement to bring opposite faces and edges thereof in contact with the track.

3. The combination with a saw mill carriage and track therefor, of a scraper having a slotted shank with a free rising and falling movement relatively to the carriage and provided with a scraping head having a central apex serving as a fulcrum means on which the scraper swings in assuming reverse positions.

4. The combination with a saw mill carriage having wheels and a track on which the said wheels have reverse movement, of a track scraper having a slotted shank loosely connected to the side of the carriage running adjacent to the saw and having a free gravitating movement and a reverse swinging action, the scraper having a substantially triangular head provided with cleaning faces and edges which respectively engage the track and are located adjacent to one of the carriage wheels.

5. As an improved article of manufacture, a scraper for a saw mill carriage having a slotted shank and a substantially triangular head provided with lower angularly intersecting faces and upper outwardly converging cleaning edges.

6. The combination with a saw mill carriage, of a track scraper provided with an apex at its lower end and having a loose rising and falling connection with the carriage and also a pivotal reversing movement to bring opposite faces and edges thereof in contact with the track, the falling movement of the scraper being controlled solely by gravity and the reversing movement thereof regulated exclusively by the apex at the lower end of the scraper acting as a fulcrum and resting upon the surface which it engages during the operation of the carriage.

In testimony whereof I have hereunto set my hand in presence of two subscribing witnesses.

EDWARD P. HUEBER.

Witnesses:
 ROBT. A. COLE,
 WALTER HAWK.